Aug. 19, 1924.
A. T. POTTER
WINDSHIELD CONSTRUCTION
Filed Aug. 31, 1921
1,505,287
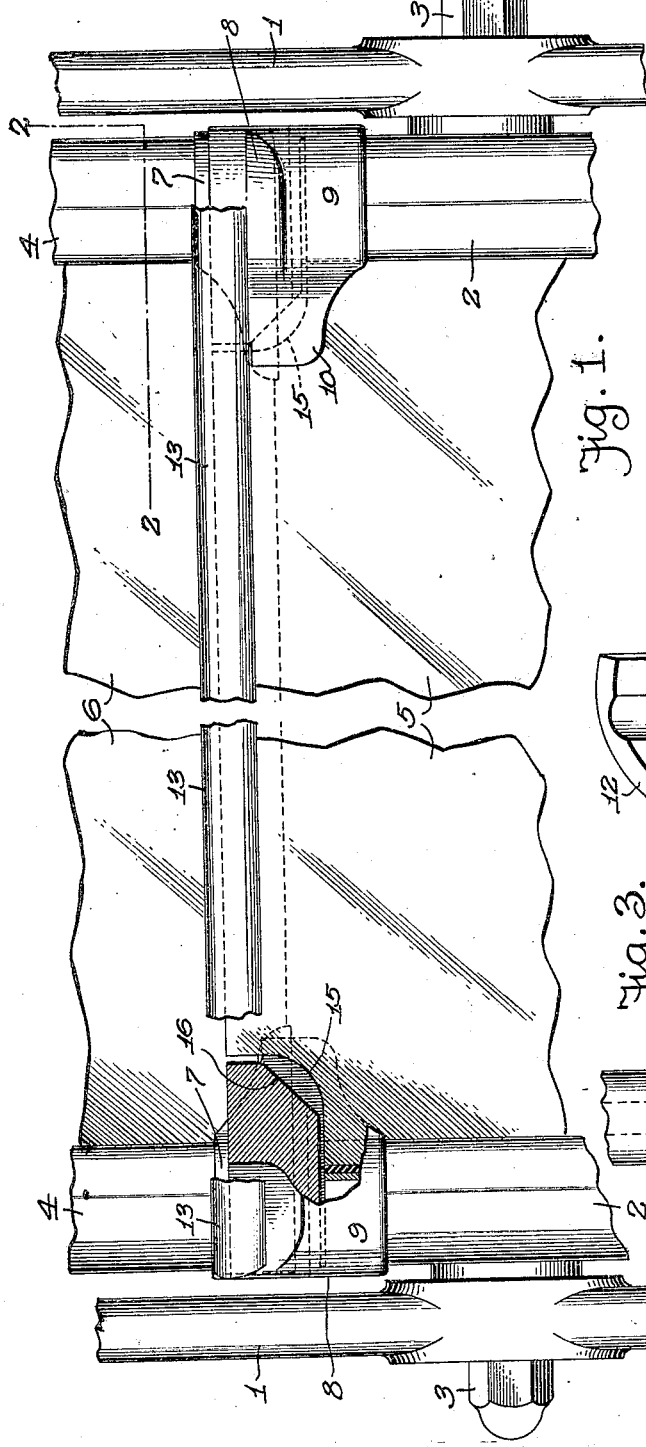
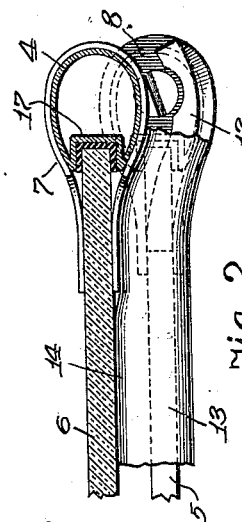
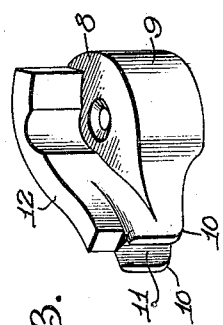
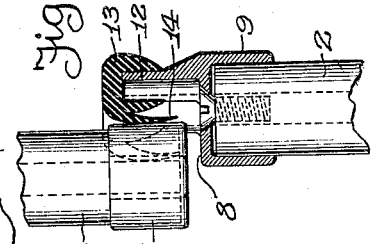
Inventor
Albert T. Potter,
By
Attorneys Patented Aug. 19, 1924.

1,505,287

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD CONSTRUCTION.

Application filed August 31, 1921. Serial No. 497,285.

*To all whom it may concern:*

Be it known that I, ALBERT T. POTTER, a citizen of the United States of America, residing at Detroit, in the county of Wayne and State of Michigan, who have invented certain new and useful Improvements in Windshield Construction, of which the following is a specification, reference being had therein to the accompanying drawings.

In the construction of wind-shields for motor vehicles and particularly those where the upper and lower sashes or panels are hinged and overlap at their adjacent edges, it is common to place a rubber weather strip over the upper edge of a glass panel to abut the glass of the upper panel and make a tight joint so that the rain can not beat through the crack. The glass panel of the lower or inner sash to which the weather strip is applied, is held at the upper corners of the panel by suitable castings and these castings abutting the castings on the upper sash hold the sashes apart and it is necessary to stop the weather strip adjacent these castings thus leaving a crack at each corner of the frames through which the rain will work its way and get into the car.

The object of this invention is to provide a simple construction which may be employed in connection with windshields as commonly constructed and wherein provision is made for extending the weather-strip past the corner irons and thus sealing the joint at the corners of the frames as well as throughout the length of the glass panels.

A further object of the invention is to so construct these corner irons as to facilitate the application of the glass panel to the frame, preventing breakage of the panel where it is necessary to notch the corners thereof to receive the corner irons.

A further object is to provide certain other new and useful features in the construction and arrangement of parts, all as hereinafter more fully described.

With the above and other ends in view, the invention consists in the matters hereinafter set forth and more particularly pointed out in the appended claims, reference being had to the accompanying drawing in which Figure 1 is an elevation of the portions of a windshield and its support illustrating the application of the invention thereto and showing parts broken away and in section to more clearly disclose the construction;

Fig. 2 is a sectional detail substantially upon the line 2—2 of Fig. 1;

Fig. 3 is a sectional detail showing the wind-shield frames in end elevation with the corner iron of the lower frame in vertical section; and Fig. 4 is a perspective view of a corner iron.

In the construction shown in the accompanying drawing 1 indicates suitable side supporting members for the wind-shield which are carried by the body of the car and form rigid supports for the wind-shield to which the wind-shield frame is pivotally attached, the lower frame members 2 forming the ends of the frame being pivotally attached, as at 3, to the supports 1. The end members 4 of the upper frame or sash are pivotally supported in any suitable manner (not shown) by the supports 1 and are in the vertical fore-and-aft planes of the members 2 of the lower frame. 5 indicates the glass panel of the lower sash or frame and 6 the glass panel of the upper sash and the sashes are so arranged that these glass panels overlap at their adjacent edges, the panel 5 extending upwardly a short distance at the inner side of the lower edge of the panel 6. The frame members 4 of the upper sash are provided with the usual corner members or irons 7 which form caps over the lower ends of the tubular members 4 and also serve as corner brackets to engage and hold the panel 6 in place. Corner members 8 are also provided for the same purpose upon the upper ends of the tubular frame members 2 of the lower sash, these corner members 8 being specially constructed and embodying the invention.

Each of these corner members 8 comprises a socket portion 9 to receive the upper end of the tubular frame member 2, forming a cap for closing the end of the tubular member and being also provided with laterally extending parallel ears 10 adapted to embrace the glass panel 5 adjacent each corner thereof to hold the glass in place. A glass receiving channel 11 is thus formed between the ears 10 and the corner member is provided with an upstanding rib 12 with its inner end in alignment with the channel 11, said rib being curved laterally to conform somewhat to the curved rear side wall of the socket 9. When the sashes are in closed position, this upstanding rib 12 of each corner iron overlaps the adjacent corner iron 7 of the upper sash, said corner iron 7 projecting partly over the socket portion 9 of the corner member 8 so that the glass panels of the two sashes will lie in parallel vertical planes with their lower edges in overlapped relation and spaced apart.

The space between the glass panels is closed by a rubber weather strip 13 of channel form, the channel of the weather strip being of a width to fit closely over the upper edge of the glass 5. The side of the weather strip toward the panel 6 is formed with a supplemental lip or tongue 14 which is free along its lower edge and tends to spring outwardly away from the body of the strip into firm contact with the glass panel 6 and thus close the space between the adjacent edge portions of the two panels, the tongue 14 forming a yieldable portion of the strip so that the panels may be swung toward each other and compress this side of the weather strip slightly to insure a tight joint.

The weather strip is extended at its ends beyond the upper edge of the panel 5 and engaged over the ribs 12 provided upon the two corner irons 8 of the lower sash. The end portions of the weather strip are therefore continued to the full width of the lower sash, being held in place upon the corner irons by engaging the upstanding flanges 12. As these flnages are curved laterally away from the upper sash, the weather strip makes a tight joint between the corner irons 8 on the lower sash and the corner irons 7 on the upper sash without holding the sashes spaced so far apart that the weather strip will not engage the glass panel 6 of the upper sash and fill the space between the panels. A tight joint is therefore formed by the weather strip between the sashes throughout their entire length.

In order that the upper edge of the panel 5 may be flush with the upper edge of the rib 12 so that said edge and rib will form a continuous support for the channeled weather strip, said panel 5 is cut away or notched, as at 15, at each of its upper corners, and the casting forming each corner iron 8 is cut away, as at 16, between its flanges 10 to obviate the necessity for forming a square corner notch in the glass but this notch may be formed, as shown, with a rounded corner which is much easier to cut than a square corner and also adds strength to the glass so that the panel is not nearly as liable to crack inwardly from this rounded corner as it would be if the corner were formed by edges meeting at an angle. Further, a round corner may be ground in the manufacture of the panel without danger of cracking the glass, while a square corner is difficult to cut without cracking the panel.

The glass panels of wind-shields of this type as commonly constructed, are notched at the corners to permit the upper edge of the panel to extend upwardly to the plane of the top of the corner irons and to permit the side edge of the panel to engage the channel 17 of the tubular frame members 2 and 4. These notches are usually formed with inner angles which are difficult to cut without breaking the glass.

In the present construction it is unnecessary to form the notches in the glass panels with sharp inner angles, due to the construction of the corner irons, but may be formed with rounded inner angles, thus facilitating manufacture and greatly reducing the liability of breakage.

The ribs 12 on the corner irons 8 form continuations of the upper edge of the glass panel 5 and thus a firm and rigid support for the end portions of the channeled weather strip are provided and a tight joint is secured between the two sashes throughout their entire length.

Obviously, changes may be made in the form and construction of the device within the scope of the appended claims without departing from the spirit of the invention, and I do not therefore limit myself to the particular form or arrangement shown.

Having thus fully described my invention, what I claim is:—

1. A corner member for windshield sashes wherein said sashes comprise end frame members and glass panels held by said frame members with free edges of the panels in overlapping relation; said corner members comprising a socket portion to receive the end of an end frame member, and an upstanding portion forming a continuation of the free edge of the glass panel and offset laterally to overlap a socket portion of a corner member on an overlapping sash, said upstanding portion being adapted to engage an end portion of a channel of a weather-strip on said free edge of said glass panel.

2. In a windshield, the combination of an upper sash, a lower sash, said sashes being arranged to overlap at their adjacent edge portions, corner members on said sashes in overlapping relation, glass panels in said sashes with a free edge of one panel overlapping a free edge of the other panel, said panels being held by said corner members within said sashes, flanges on the corner members of one of the sashes adapted to overlap the corner members on the other sash and to form a continuation of the edge of said glass panel held by said flanged corner members, and a channel weatherstrip engaged over said flanges and over the free edge of the glass panel of which said flanges form a continuation.

3. In a wind shield, the combination with a sash frame and a glass panel in said frame having a free edge portion, of corner members for the sash frame formed with channels to receive the glass panel, said glass panel being notched at its corners adjacent the corner members to provide a free projecting edge portion above said corner members, and an upwardly projecting flange on each corner member curved laterally to permit the corner member of an adjacent panel to project over said corner member having said flange with its free edge lying in the plane of the free edge of the glass panel and forming a continuation thereof, said projecting portions of the corner members and the free edge of the panel being adapted to receive a channeled weather strip.

4. In a wind shield, the combination with a sash frame and a glass panel in said frame having a free edge portion, of corner members for the frame at the ends of the free edge of the glass panel and formed with channels to receive end edge portions of the glass panel, said glass panel being formed with notches in its corners adjacent the corner members which notches have rounded inner angles, said corner members being formed with formed portions adapted to be received in said notches and with upstanding flanges to overlap corner members of an adjacent panel and to form a continuation of said free edge of the glass panel.

5. In a wind shield, the combination with a sash frame including tubular end members, and a glass panel in said frame having a free edge portion, of corner members for said sash frame at each end of the free edge of the glass panel and comprising socket portions to receive the ends of said tubular sash frame members and provided with channels to receive corner portions of the glass panel, and an upwardly projecting flange on each corner member to overlap a corner member on an adjacent frame, said flanges being curved laterally of said member to conform substantially to a curved side face of the member, and permit a side of corner members on an adjacent frame to extend over the members having the flanges, said flanges forming a continuation of the free edge of the glass panel to receive a channeled weather strip.

In testimony whereof I affix my signature in presence of two witnesses.

ALBERT T. POTTER.

Witnesses:
KARL H. BUTLER,
SHIRLEY WHEELOCK.